United States Patent [19]
Leemke

[11] Patent Number: 4,655,659
[45] Date of Patent: Apr. 7, 1987

[54] ROOFING FASTENER

[76] Inventor: Stuart H. Leemke, Rte. 2, Box 288C, Mukwonago, Wis. 53149

[21] Appl. No.: 808,220

[22] Filed: Dec. 12, 1985

Related U.S. Application Data

[63] Continuation of Ser. No. 636,085, Aug. 1, 1984, abandoned, which is a continuation of Ser. No. 414,932, Sep. 3, 1982, abandoned.

[51] Int. Cl.⁴ ............................................. F16B 15/00
[52] U.S. Cl. .................................. 411/359; 411/140; 411/448
[58] Field of Search .................. 411/140, 356–359, 411/392, 394, 399, 402, 403, 410, 928, 448; 238/367, 375

[56] References Cited

U.S. PATENT DOCUMENTS

| | | | |
|---|---|---|---|
| 641,191 | 1/1900 | Champion | 411/402 |
| 669,077 | 3/1901 | Durgoraw | 411/358 |
| 1,428,111 | 9/1922 | Molesworth | 411/359 |
| 1,525,822 | 2/1925 | Nalle | 411/359 |
| 1,548,456 | 8/1925 | Goodman | 411/359 |
| 4,242,932 | 1/1981 | Barmore | 411/410 |
| 4,361,997 | 12/1982 | DeCaro | 411/542 |

FOREIGN PATENT DOCUMENTS

| | | | |
|---|---|---|---|
| 352835 | 10/1905 | France | 411/359 |
| 663,604 | 4/1929 | France | 411/358 |
| 11242 | of 1897 | United Kingdom | 411/359 |

Primary Examiner—Gary L. Smith
Assistant Examiner—Neill Wilson
Attorney, Agent, or Firm—Andrus, Sceales, Starke & Sawall

[57] ABSTRACT

A fastener for securing two pieces of roofing material includes an elongated member having a pointed tip end and a flange like head end. The elongated member includes an internal channel that extends substantially the entire length of the member and terminates in an opening in the head and a double faced ramp at the tip. A plunger and flexible barb are disposed for longitudinal movement within the channel and the elongated member contains a pair of sidewall openings located proximate the ramp and communicating with the channel. The openings are provided with barb directing surfaces that engage the barb and cause it to move in a direction substantially perpendicular to the longitudinal axis of the channel as the barb exits the opening. The opening is also provided with a barb engaging surface that produces a frictional drag on the barb causing it to curl as it exits the opening.

2 Claims, 6 Drawing Figures

ROOFING FASTENER

This is a continuation of application Ser. No. 636,085 filed Aug. 1, 1984, now abandoned, which is a continuation of application Ser. No. 414,932 filed Sept. 3, 1982, now abandoned.

BACKGROUND OF THE INVENTION

This invention relates to a fastening device and more particularly to a fastener for joining layers of roofing material.

The present invention provides a fastener for joining a layer of insulation to a light weight deck or for joining two layers of insulation.

Heretofore, the joining of these materials has been accomplished through the utilization of a layer of hot asphalt applied between the two materials or by predrilling the deck and utilizing a toggle bolt as a fastener.

Besides being a costly and time consuming process, the use of toggle bolts often resulted in thermal bridging through the deck.

Fasteners such as that shown in Lancaster's British Pat. No. 11,242 utilize material engaging barbs, but fail to provide sidewall openings having the proper configuration necessary to allow the barb to exit in the desired direction and curl upon exiting.

It is an object of the present invention to provide a fastener that will securely join two pieces of light weight material such as roofing materials and one that will consistently perform in a reliable manner during installation i.e. will consistently introduce a curling barb into the material.

SUMMARY OF THE INVENTION

A fastening device includes an elongated member that terminates in a pointed tip at one end and in a flange like head at the other end.

An internal channel extends substantially the entire length of the elongated member and terminates at the head end in an opening and at the tip end in a ramp that extends downwardly and outwardly toward the sidewalls of the elongated member.

A plunger and a flexible barb are disposed for longitudinal movement within the channel.

A pair of sidewall openings in the elongated member are positioned proximate the ramp and communicate with the channel. The openings are provided with directing surfaces that engage the barb and direct the barb out the sidewall opening in a desired direction. The openings are also provided with a barb engaging surface that produces a frictional drag on the barb and causes the barb to curl as it exists the sidewall opening.

The present invention thus provides a fastener that allows for the non-thermal joining of two pieces of roofing material and which is so designed as to perform in a consistently reliable manner during its installation.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
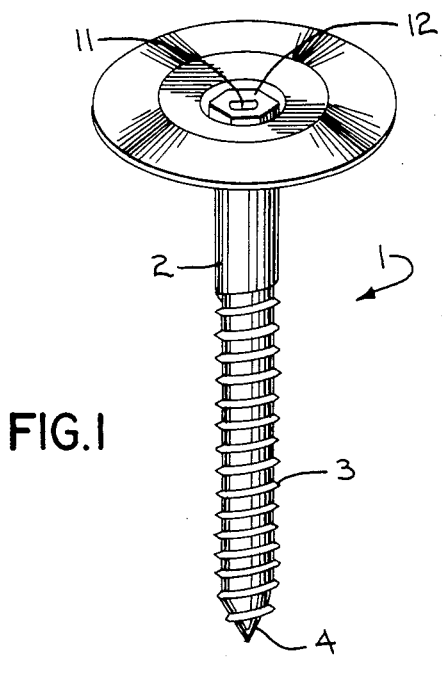
FIG. 1 is a perspective view of a fastener constructed according to the invention.
Figure 2:
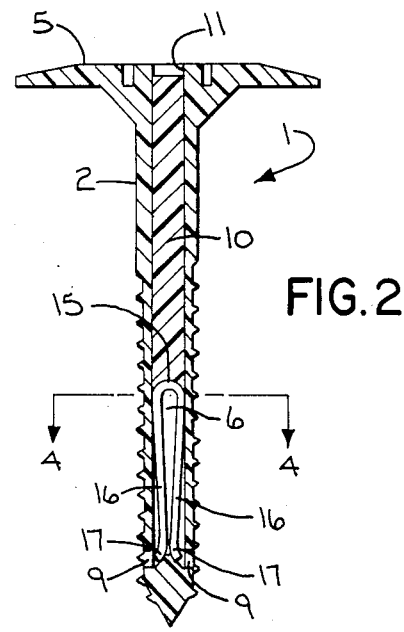
FIG. 2 is a side cross sectional view of the fastener of FIG. 1.
Figure 3:
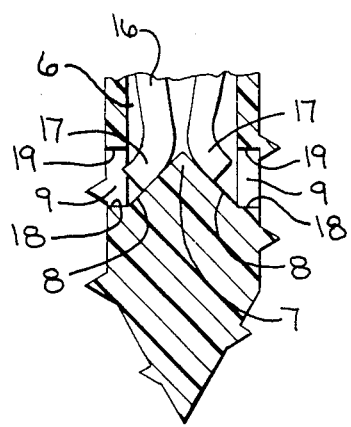
FIG. 3. is a side cross sectional view of the tip portion of the fastener of FIG. 1.

A pre-assembled fastener 1 includes an elongated member 2 having external screw threads 3 and terminating in a pointed tip 4 at one end and in a flange like head 5 at the other end.

Elongated member 2 has an internal channel 6 running substantially the entire length of member 2 and terminating at one end in an opening in head 5 and terminating at the other end in a double faced ramp 7 located near the tip 4 of member 2.

Ramp 7 has a pair of faces 8 that extend outwardly and downwardly toward a pair of sidewall openings 9 in member 2.

A plunger 10 is disposed for longitudinal movement within channel 6 and communicates with an opening 11 in head 5. Opening 11 is a rounded off rectangle in order to direct the barb (discussed below) to a correct position on ramp 7 and in order to provide structural strength to elongated member 2. Opening 11 is disposed within a hexogonal protrusion 12 located within a recess in flange like head 5. Protrusion 12 provides a tool engaging surface that mates with a tool (not shown) during the installation of fastener 1. Protrusion 12 also serves to position and locate a ram 13 that engages plunger 10 through opening 11.

A U-shaped wire member 14 is also disposed for longitudinal movement within channel 6 and has its base portion 15 in engagement with the bottom surface of plunger 10. The legs 16 of U-shaped member 14 form a pair of flexible barbs having outwardly flaired ends 17 that engage faces 8 of ramp 7.

Each of sidewall openings 9 is provided with a barb directing surface 18 formed by a flat in the lower portion of opening 9. Barbed directing surface 18 engages end 17 of leg 16 and guides legs 16 in a direction substantially perpendicular to the longitudinal axis of channel 6.

Openings 9 are also provided with a barb engaging surface 19 that causes a frictional drag on leg 16 as it exits opening 9 and thus causes leg 16 to curl as it exits opening 9.

Figure 5:
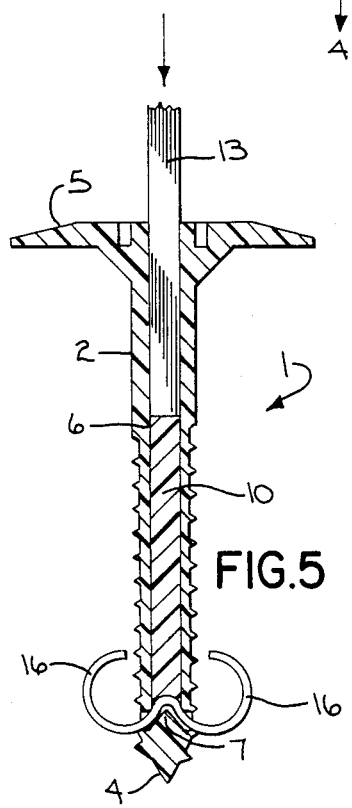
FIG. 5 is a side cross sectional view of the fastener shown after the plunger has been depressed and the barbs have been forced out the sidewall openings.
Figure 4:
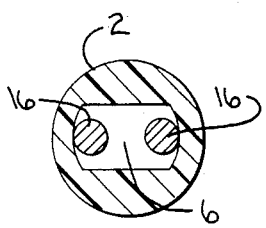
FIG. 4 is a section taken along the line 4—4 of FIG. 2.
Figure 6:
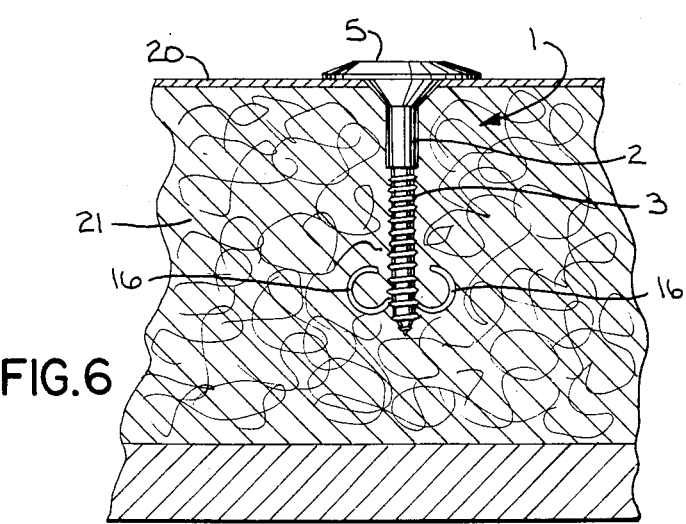
FIG. 6 is a side cross sectional view of a roof deck showing the fastener after installation.

As seen in FIGS. 5 and 6, fastener 1 is used to join a sheet of roofing material 20 to a sheet of insulation or other fiberous roofing material 21. Fastener 1 is first screwed into materials 20 and 21 by means of a tool that engages hexogonal protrusion 12 and rotates fastener 1.

Once fastener 1 has been embedded in materials 20 and 21 ram 13 enters head opening 11 and engages plunger 10 forcing it downwardly. The downward movement of plunger 10 forces leg 16 of U-shaped member 14 down ramp faces 8 and toward sidewall openings 9.

As leg 16 begins to exit sidewall opening 9 it engages barb directing surface 18 and is forced to exit in a direction substantially perpendicular to the longitudinal axis of channel 6.

As leg 16 exits opening 9 its surface comes into contact with barb engaging surface 19 which produces a frictional drag on the side of leg 16 and causes leg 16 to curl as it exits opening 9.

Thus materials 20 and 21 are firmly secured to each other not only by the threaded portion of fastener 1 but also by the barbs 16 which have curled upwardly and engaged the fibers of material 21.

Also, flange like head 5 is in the form of a disc having a diameter substantially greater than that of elongated member 2. The large disc shaped head provides a large surface area for contact with roofing material 20. This provides greater holding strength and is particularly important when roofing material 20 is a fibrous material such as insulation.

The present invention thus provides a nonthermal fastener that consistently performs in a reliable manner during installation.

The above description has been limited to the joining of two pieces of roofing material, however, the applicant foresees a myriad of uses for his fastener and does not wish to limit his invention to the roofing art.

Various modes for carrying out the invention are contemplated as being within the scope of the following claims particularly pointing out and distinctly claiming the subject matter which is regarded as the invention.

I claim:

1. A rotary driven fastener for securing insulation to a roof deck comprising:

an elongated member terminating in a point at a tip end and having a flange like head at its other end, said elongated member having an internal channel extending substantially the entire length of said member and terminating at said flange end in an opening and at said tip end in at least one sidewall opening in said elongated member, said flange end having rotary tool engaging surfaces disposed substantially adjacent to and spaced from said flange end opening so that said fastener may be mated with a rotating tool for the rotation of the fastener during installation of said fastener without obstructing said flange end opening, a plunger disposed for longitudinal movement in said channel, at least one flexible barb engageable with said plunger and extending along said channel toward said tip end, a multi-surface barb-engaging ramp located proximate said tip end and adjacent said sidewall opening, said ramp having a first surface extending downwardly and outwardly toward said sidewall opening, said first surface extending upwardly into said channel at least to a point co-planar with a horizontal plane formed by the upper edge of said sidewall opening and a second surface angularly disposed at the lower end of said first surface so as to extend toward said sidewall opening substantially normal to the longitudinal axis of said elongated member, said second surface providing a deflection surface to engage the bottom surface of said barb and to direct said barb out of said sidewall opening in a direction substantially normal to the longitudinal axis of said elongated member and to effect the engagement of the top surface of said barb with a barb engaging corner at the upper edge of said sidewall opening to produce a frictional drag on said top surface of said barb and cause said barb to curl upwardly as said barb exits said sidewall opening and follow an arcuate path terminating at a point substantially adjacent to the outer surface of said elongated member.

2. The fastener defined in claim 1 wherein said first and second surfaces define distinct planes meeting at an inflection transition angle in order to cause said barb when engaged by said plunger to move in a first direction relative to the longitudinal axis of said elongated member prior to exiting through said sidewall opening and in a second direction substantially normal to the longitudinal axis of said elongated member as said barb exits through said sidewall opening.

* * * * *